Sept. 8, 1936.     F. B. POWERS     2,053,440
MOTOR CONTROL SYSTEM
Filed July 12, 1933
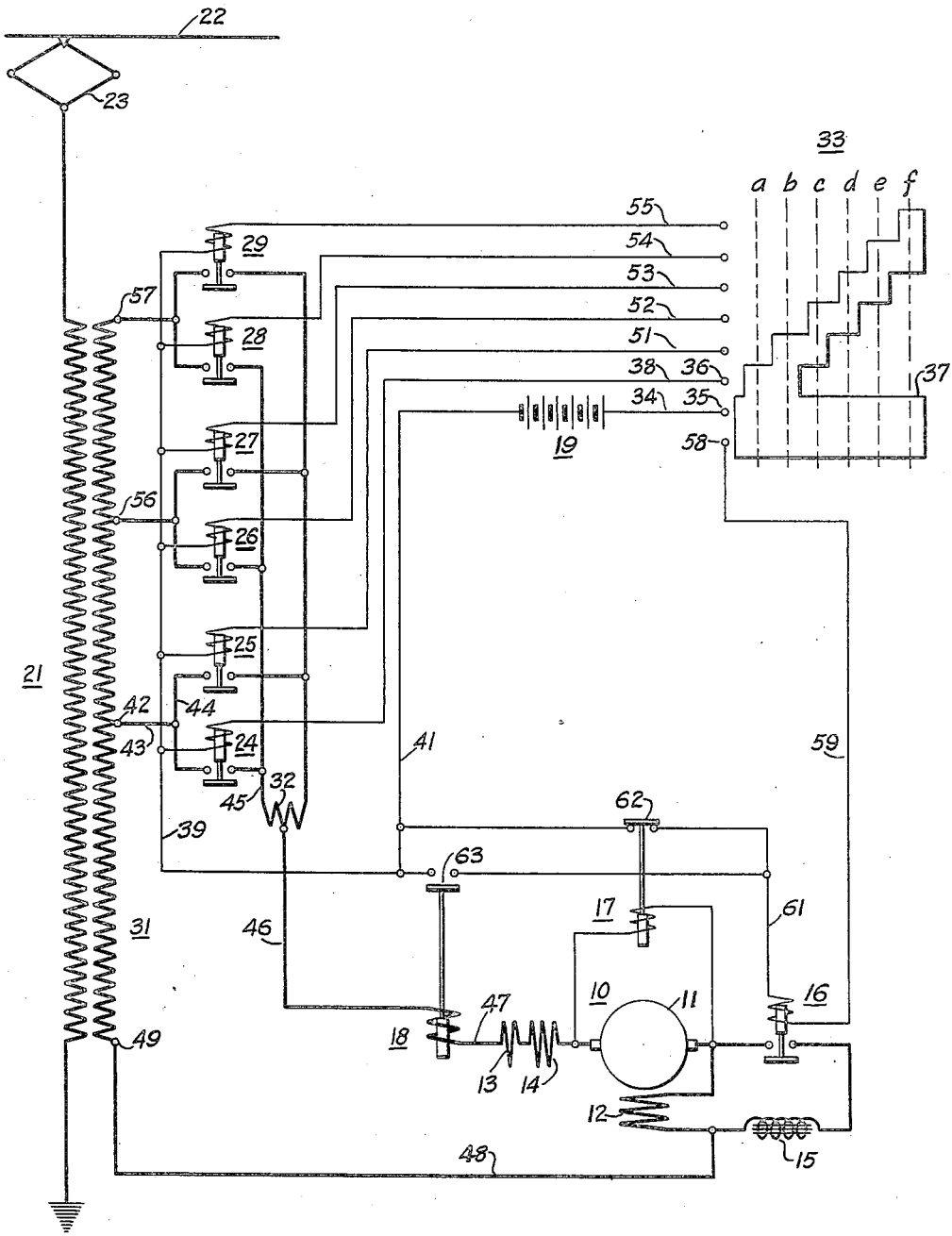
WITNESSES:
INVENTOR
Frank B. Powers.
BY
ATTORNEY Patented Sept. 8, 1936

2,053,440

UNITED STATES PATENT OFFICE 2,053,440

MOTOR CONTROL SYSTEM

Frank B. Powers, Forest Hills, Pa., assignor to Westinghouse Electric & Manufacturing Company, East Pittsburgh, Pa., a corporation of Pennsylvania Application July 12, 1933, Serial No. 680,064

5 Claims. (Cl. 172—179)

My invention relates, in general, to motor control systems, and, more particularly, to systems for controlling the operation of alternating-current motors of the series commutator type.

In order to reduce sparking of alternating-current commutator motors, the current in the main field winding is reduced during the starting period and at low speeds to weaken the field excitation, thereby reducing the local current induced in the armature conductors which are short-circuited by the brushes during commutation. The field excitation may be reduced during the starting period by shunting a portion of the main field current through an iron-core reactor connected in parallel circuit relation to the main field winding. However, this scheme of reducing the main field current is not satisfactory above certain speeds and it is necessary to provide full field excitation when a certain speed has been reached in order that proper commutation will be obtained at the higher speeds.

Inasmuch as the torque developed by a motor is proportional to the product of the field flux and the armature ampere turns, the reduction of the field current during the starting period necessitates a corresponding increase in the armature current in order to develop sufficient torque during this period. Therefore, care must be exercised to prevent the application of full field excitation to the motor while the armature current exceeds the safe limit for full field operation.

An object of my invention is to provide for reducing the main field current of a motor during the starting period and for automatically increasing the field current when the motor attains a predetermined speed.

A further object of my invention is to prevent increasing the field current of a motor while the armature current exceeds a predetermined value.

Other objects of my invention will be described fully hereinafter or will be apparent to those skilled in the art.

In accordance with one embodiment of my invention the current in the main field winding of a motor may be reduced during the starting period by providing an iron core reactor which is connected in parallel circuit relation to the main field winding by means of a contactor switch. Two relays are provided for controlling the operation of the switch which connects the reactor shunt in the motor circuit, one of the relays is a voltage relay which is so connected that it is responsive to the counter electro-motive force of the motor and is, therefore, operated when the motor attains a predetermined speed. The other relay is responsive to the armature current of the motor and the contact members of the two relays are so connected that the relays cooperate to permit the changeover from weak field to full field to be made only at a definite predetermined speed and armature current, regardless of the operation of the master controller. In this manner sparking is reduced during starting of the motor and good commutation may be secured during all operating conditions.

For a fuller understanding of the nature and scope of the invention, reference may be had to the following detailed description, taken in conjunction with the accompanying drawing, in which the single figure is a diagrammatic view of a motor control system embodying my invention.

Referring to the drawing, the reference character 10 designates, generally, a motor of a type suitable for propelling an electric vehicle (not shown). In the embodiment of the invention which is illustrated, the motor 10 is a single-phase alternating-current motor of the series commutator type, having an armature winding 11, a main field winding 12, an interpole winding 13 and a compensating winding 14.

An iron-core reactor 15 is disposed to be connected in parallel circuit relation to the field winding 12 during starting of the motor by means of an electrically-operated switch 16. The operation of the switch 16 is controlled by two relays 17 and 18. The actuating coil of the relay 17 is connected across the armature of the motor 10, thereby causing the relay to be responsive to the counter-electromotive force, and consequently, the speed of the motor. The relay 18 is a current relay and its actuating coil is so connected in the motor circuit that the relay is responsive to the armature current in the motor 10.

The contact members of the relays 17 and 18 are connected in parallel in a manner such as to cause the switch 16 to be closed while the motor is operating below a predetermined speed and also while the armature current exceeds a predetermined value, thereby producing a weak field in the motor for starting and full field strength under predetermined speed and current conditions, as will be described more fully hereinafter.

A battery 19 is provided for supplying direct current for operating the control equipment. Power for operating the motor 10 is supplied from a transformer 21 which is energized from a trolley conductor 22 through a current collector 23 of the pantograph type.

In accordance with the usual practice in electric railway systems utilizing alternating-current power, the motor 10 may be accelerated by increasing the voltage applied to the motor by means of a plurality of accelerating or tap-changing switches 24 to 29, inclusive. The accelerating switches are disposed to so connect the motor 10 to the secondary winding 31 of the transformer 21 that the voltage applied to the motor may be increased by successive steps to accelerate the motor.

A preventive coil 32, which may be either a resistance or an inductance, is connected in the motor circuit to prevent short circuiting a portion of the transformer winding 31 when the motor connections are being transferred from one transformer tap to the next.

The operation of the accelerating switches may be controlled by a manually-operable controller 33, which may be of the drum type comprising a plurality of contact fingers disposed to engage contact segments as the controller drum is rotated.

In order to simplify the drawing and description, the number of accelerating switches has been limited to that required for establishing three different connections to the transformer winding 31. It will be understood that additional connections may be readily provided by the addition of a number of tap-changing or accelerating switches, thereby increasing the number of steps in the speed range of the motor.

In order that the functioning of the apparatus may be better understood, the operation of the system will now be described. Assuming that it is desired to connect the motor 10 to the power source to accelerate the motor, the controller 33 may be actuated to position "a", thereby energizing the actuating coil of the switch 24. The circuit for the actuating coil of the switch 24 may be traced from the positive terminal of the battery 19, through conductor 34, contact fingers 35 and 36, bridged by contact segment 37 of the controller 33, conductor 38, the actuating coil of the switch 24 and conductors 39 and 41 to the negative terminal of the battery 19.

When the switch 24 is closed, the motor 10 is connected to the secondary winding 31 of the transformer through a circuit which extends from a terminal 42 of the winding 31, through conductors 43 and 44, contact members of switch 24, conductor 45, preventive coil 32, conductor 46, actuating coil of the relay 18, conductor 47, interpole winding 17, compensating winding 14, the armature 11, main field winding 12 and conductor 48 to a terminal 49 of the transformer winding 31.

The motor 10 may be accelerated in a manner well known in the art by advancing the controller through positions "b", "c", "d", "e" and "f" to energize the actuating coils of the switches 25 to 29 inclusive, in sequential relation, through conductors 51, 52, 53, 54 and 55, respectively. It will be understood that, as the switches 25 to 29 are closed in sequential relation to connect the motor 10 to the terminals 56 and 57 of the transformer winding 31, the voltage applied to the motor is gradually increased, thereby causing the motor to accelerate in speed.

As previously explained, it is desirable to weaken the field excitation of the motor 10 during starting and at low speeds in order to reduce the current in the armature conductors which are short-circuited by the brushes during commutation, thereby preventing sparking at the commutator of the motor. In order to weaken the field excitation of the motor 10, the reactor 15 is connected in parallel circuit relation to the field winding 12 during the starting period by means of the switch 16.

It will be seen that the actuating coil of the switch 16 is energized to close the switch when the controller 33 is actuated to position "a". The energizing circuit may be traced from the positive terminal of the battery 19, through conductor 34, contact fingers 35 and 58 bridged by the contact segment 37, conductor 59, actuating coil of the switch 16, conductor 61, contact members 62 of the relay 17 and conductor 41 to the negative terminal of the battery 19. The closing of the switch 16 connects the reactor 15 in parallel with the field winding 12, as shown, thereby reducing the current flowing in the field winding 12 and weakening the field strength of the motor.

In order that full field excitation may be provided when the motor has accelerated to a predetermined speed, the actuating coil of the relay 17 is connected across the armature 11 of the motor. The relay 17 will operate to open its contact members 62 when the speed and the counter-electromotive force of the motor attains a predetermined value.

However, as explained hereinbefore, it is unsafe to apply full field excitation to the motor if the current flowing in the armature winding exceeds a predetermined amount. In order to prevent the change-over to full field being made while the armature current exceeds the safe limit, the actuating coil of the current relay 18 is connected in series with the armature 11. The contact members 63 of the relay are connected in parallel circuit relation to the contact members 62 of the relay 17, as shown. The contact members 63 of the relay 18 are closed by the starting current drawn by the motor and they will remain closed until the armature current is reduced to a predetermined value. The energizing circuit through the actuating coil of the switch 16 is maintained through the contact members 63 when they are closed, thereby preventing the switch 16 from opening.

It will thus be seen that the relay 17, which is responsive to the speed of the motor, and the relay 18, which is responsive to the armature current, cooperate to permit the change-over from weak field to full field to be made only at a predetermined speed and voltage. Furthermore, the change-over is made independently of the operation of the master controller 33, thereby insuring good commutation under all operating conditions since the operation of the switch 16 is controlled by the actual motor conditions.

I do not desire to be restricted to the specific embodiment of my invention herein shown and described, since it is evident that it may be changed and modified without departing from the spirit and scope of my invention as defined in the appended claims.

I claim as my invention:

1. In a motor control system, in combination, a motor having a field winding, a shunt disposed to be connected in parallel circuit relation to the field winding, switching means for connecting the shunt in parallel circuit relation to the field winding during starting of the motor, and means responsive to the armature current and the speed of the motor for causing the shunt to be disconnected from the motor circuit under predetermined speed and current conditions.

2. In a motor control system, in combination, a motor having a field winding, a shunt disposed to be connected in parallel circuit relation to the field winding, switching means for connecting the shunt in parallel circuit relation to the field winding during starting of the motor, and relay means responsive to the armature current and the speed of the motor for controlling the operation of said switching means to cause the shunt to be disconnected from the motor circuit under predetermined speed and current conditions.

3. In a motor control system, in combination, a motor having a field winding, a shunt disposed to be connected in parallel circuit relation to the field winding, switching means for connecting the shunt in parallel circuit relation to the field winding during starting of the motor, a relay having an actuating coil connected across the armature of the motor to be responsive to the counter-electromotive force of the motor, and a relay responsive to the armature current of the motor, the contact members of said relays being disposed to control the operation of said switching means to cause the shunt to be disconnected from the motor circuit under predetermined speed and current conditions.

4. In a motor control system, in combination, a motor having a field winding, a shunt disposed to be connected in parallel circuit relation to the field winding, switching means for connecting the shunt in parallel circuit relation to the field winding during starting of the motor, a relay responsive to the speed of the motor, and a relay responsive to the armature current, said relays cooperating to control the operation of said switching means to cause the shunt to be disconnected from the motor circuit under predetermined speed and current conditions.

5. In a motor control system, in combination, a motor having a field winding, a shunt disposed to be connected in parallel circuit relation to the field winding, switching means for connecting the shunt in parallel circuit relation to the field winding during starting of the motor, a relay having an actuating coil connected across the armature of the motor to be responsive to the counter-electromotive force of the motor, and a relay having an actuating coil connected in series with the armature of the motor to be responsive to the armature current, the contact members of said relays being connected in parallel circuit relation to control the operation of said switching means to cause the shunt to be disconnected from the motor circuit under predetermined speed and current conditions.

FRANK B. POWERS.